(12) United States Patent
Zaher

(10) Patent No.: US 8,509,206 B2
(45) Date of Patent: Aug. 13, 2013

(54) METHOD AND ARRANGEMENT FOR ADJUSTING TIME ALIGNMENT OF A SAMPLED DATA STREAM

(75) Inventor: Ali Zaher, Malmö (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 423 days.

(21) Appl. No.: 12/934,728

(22) PCT Filed: Mar. 27, 2009

(86) PCT No.: PCT/EP2009/053649
§ 371 (c)(1),
(2), (4) Date: Oct. 4, 2010

(87) PCT Pub. No.: WO2009/118405
PCT Pub. Date: Oct. 1, 2009

(65) Prior Publication Data
US 2011/0019657 A1    Jan. 27, 2011

Related U.S. Application Data

(60) Provisional application No. 61/046,984, filed on Apr. 22, 2008.

(51) Int. Cl.
*H04B 7/216* (2006.01)
(52) U.S. Cl.
USPC ............................ 370/342; 370/310; 370/252
(58) Field of Classification Search
USPC ................. 370/208, 232, 252, 215, 286, 315,
370/350, 345, 342, 337, 320, 335, 336, 344,
370/310, 329, 464, 503, 519; 375/141, 144,
375/340, 150, 296, 232, 346, 259, 342;
455/12.1, 13.2, 13.3, 102, 450, 427, 120,
455/127.1, 313, 350
See application file for complete search history.

(56) References Cited

U.S. PATENT DOCUMENTS

| | | | | |
|---|---|---|---|---|
| 7,054,396 | B2* | 5/2006 | Shan | 375/346 |
| 8,023,556 | B2* | 9/2011 | Green et al. | 375/219 |
| 8,102,937 | B2* | 1/2012 | Helfenstein et al. | 375/295 |
| 2003/0204542 | A1 | 10/2003 | Mueller | |
| 2008/0195920 | A1* | 8/2008 | Luce et al. | 714/798 |
| 2009/0022177 | A1* | 1/2009 | Schuster et al. | 370/468 |
| 2009/0036081 | A1* | 2/2009 | Catreux et al. | 455/277.1 |
| 2009/0113429 | A1* | 4/2009 | Luschi et al. | 718/100 |

FOREIGN PATENT DOCUMENTS

WO    2006/115928 A1    11/2006

* cited by examiner

*Primary Examiner* — Abdullah Riyami
(74) *Attorney, Agent, or Firm* — Coats & Bennett, P.L.L.C.

(57) ABSTRACT

A method of adjusting time alignment of a sampled data stream is disclosed. The method comprises transferring the sampled data stream from a baseband subsystem to a digital interface, transferring the sampled data stream from the digital interface to a digital radio comprising a pulse shaping filter modulator, modulating the sampled data stream by using the pulse shaping filter modulator, and transmitting the modulated sampled data stream. The method further comprises transferring a time adjustment control signal from the baseband subsystem to the digital radio, and the modulating step comprises a step of adjusting, based on the time adjustment control signal, the time alignment of the sampled data stream using a sample resolution. Corresponding computer program product, arrangement, and electronic device are also disclosed.

13 Claims, 8 Drawing Sheets

Fig. 8

METHOD AND ARRANGEMENT FOR ADJUSTING TIME ALIGNMENT OF A SAMPLED DATA STREAM

TECHNICAL FIELD

The present invention relates generally to the field of adjusting time alignment of a sampled data stream. More particularly, it relates to such adjustment in a transmitter chain of an electronic communication device.

BACKGROUND

Traditionally, the radio parts of the transmitter chain of an electronic communication device have been working in the analogue domain. Digital radio functionality may, however, also be implemented, and digital radio parts of the transmitter chain are becoming increasingly popular.

In the course of development of digital radio chips, a digital interface standard, "DigRF, Dual-mode 2.5G/3G, Baseband/RF IC", Interface Standard, v3.09, 22 Nov. 2006 (henceforth denoted DigRF), has been developed to handle the interface between baseband modules and digital radio modules.

It may be desirable to adjust the time alignment of data packets transferred from a baseband module. Not being able to adjust the time alignment can be problematic in some situations. For example, a data packet misalignment may create problems in the base station. Such problems may be highly severe, such as for example a lost connection.

For example, if the mobile device is moving towards/away from the base station during a connection, the transmission time between the mobile device and the base station will change over time since the distance between the mobile device and the base station changes. Thus, there will be a time drift or misalignment between the data packets at the base station. Since the base station and the mobile device communications may be controlled by specific timing, drifting out of this timing may be detrimental to the connection. In connection to this example situation, reference may be made to the 3GPP ($3^{rd}$ Generation Partnership Project) standard documents TS 25.214 (2007-12), Section 4.3.4, TS 25.133 (2007-12), Section 7.1, and TS 25.211 (2007-12), Section 7.6.3.

Thus, there is a need for adjusting the time alignment to compensate for misalignment.

SUMMARY

It should be emphasized that the term "comprises/comprising" when used in this specification is taken to specify the presence of stated features, integers, steps, or components, but does not preclude the presence or addition of one or more other features, integers, steps, components, or groups thereof.

It is an object of the invention to obviate at least some of the above disadvantages and to provide methods and arrangements for adjusting time alignment of a sampled data stream.

According to a first aspect of the invention, this is achieved by a method of adjusting time alignment of a sampled data stream having a first sample resolution. The method comprises transferring the sampled data stream from a baseband subsystem to a digital interface, transferring the sampled data stream from the digital interface to a digital radio comprising a pulse shaping filter modulator, modulating the sampled data stream by using the pulse shaping filter modulator, and transmitting the modulated sampled data stream. The method also comprises transferring a time adjustment control signal from the baseband subsystem to the digital radio, and the modulating step comprises a step of adjusting, based on the time adjustment control signal, the time alignment of the sampled data stream using a second sample resolution.

In some embodiments, the second sample resolution is higher than the first sample resolution.

In some embodiments, the method may further comprise converting, in the digital interface, the sampled data stream to an in-phase sampled data stream and a quadrature sampled data stream, and modulating the in-phase and quadrature sampled data streams separately.

In some embodiments, the digital interface may be compliant with the DigRF standard.

In some embodiments, the digital radio may comprise a Wideband Code Division Multiple Access—WCDMA—modulator and the WCDMA modulator may comprise the pulse shaping filter modulator.

In some embodiments, the pulse-shaping filter may be a root raised cosine filter.

In some embodiments, the step of adjusting the time alignment of the sampled data stream may comprise adjusting a phase of the pulse-shaping filter based on time adjustment control signal, and modifying coefficients of the pulse-shaping filter based on the adjusted phase.

In some embodiments, the step of transferring the time adjustment control signal from the baseband subsystem to the digital radio may comprise transferring the time adjustment control signal from the baseband subsystem to the digital interface, converting the time adjustment control signal to a time adjustment value, and transferring the time adjustment value from the digital interface to the digital radio.

In some embodiments, the method may further comprise converting the time adjustment control signal to an apply time adjustment flag, transferring the apply time adjustment flag from the digital interface to the digital radio, and performing the step of adjusting the time alignment of the sampled data stream when the apply time adjustment flag is set.

In some embodiments, the step of adjusting the phase of the pulse shaping filter based on time adjustment control signal may comprise updating the phase of the pulse shaping filter by adding a default phase update offset value and the time adjustment value to the phase.

In some embodiments, the method may further comprise determining whether adjusting the phase of the pulse shaping filter results in reprocessing of a sample of the sampled data stream, and, if adjusting the phase of the pulse-shaping filter results in reprocessing of a sample of the sampled data stream, postponing the step of adjusting the time alignment of the sampled data stream and updating the phase of the pulse shaping filter by adding the default phase update offset value to the phase.

In some embodiments, the method may further comprise determining whether adding the default phase update offset value and the time adjustment value to the phase gives a first result value that is less than a threshold, and if the first result value is less than the threshold, postponing the step of adjusting the time alignment of the sampled data stream, and updating the phase of the pulse shaping filter by adding the default phase update offset value to the phase. The threshold may be zero.

A second aspect of the invention is a computer program product comprising a computer readable medium, having thereon a computer program comprising program instructions, the computer program being loadable into a data-processing unit and adapted to cause the data-processing unit to execute at least the step of adjusting the time alignment according to the first aspect of the invention when the computer program is run by the data-processing unit.

A third aspect of the invention is an arrangement for adjusting time alignment of a sampled data stream having a first sample resolution. The arrangement comprises a baseband subsystem, a digital interface, and a digital radio comprising a modulator and a transmitter. The baseband subsystem is adapted to transfer the sampled data stream to the digital interface, the digital interface is adapted to transfer the sampled data stream to the digital radio, the modulator is adapted to modulate the sampled data stream, and the transmitter is adapted to transmit the modulated sampled data stream. The baseband subsystem is adapted to transfer a time adjustment control signal to the digital radio, and the modulator is adapted to adjust, based on the time adjustment control signal, the time alignment of the sampled data stream using a second sample resolution.

In some embodiments, the modulator comprises a Wideband Code Division Multiple Access—WCDMA—modulator and the WCDMA modulator comprises a pulse shaping filter modulator.

In some embodiments, the modulator may comprise a phase counter adapted to provide a phase of the pulse shaping filter, and a modulation control unit adapted to adjust the phase based on time adjustment control signal. In some embodiments, the pulse shaping filter modulator may be adapted to modify coefficients of the pulse-shaping filter based on the adjusted phase.

In some embodiments, the third aspect of the invention may additionally have features identical with or corresponding to any of the various features as explained above for the first aspect of the invention.

A fourth aspect of the invention is an electronic device comprising the arrangement of the third aspect of the invention. In some embodiments, the electronic device may be a mobile terminal.

The first sample resolution may be defined as the smallest possible time alignment adjustment that can be made in the baseband subsystem. The second sample resolution may be defined as the smallest possible time alignment adjustment that can be made in the digital radio according to embodiments of the invention. Thus, that the second sample resolution is higher than the first sample resolution in some embodiments means that a time alignment adjustment can be made in smaller steps if using the second sample resolution rather than the first sample resolution.

One of the advantages of embodiments of the invention is that time alignment of a sampled data stream may be achieved.

A further advantage of embodiments of the invention is that the alignment can be achieved with high resolution.

A further advantage of embodiments of the invention is that timing adjustments are achievable that are smaller than the distance between the samples that are transferred between the baseband module and the radio module. This allows for fine-tuning of the timing adjustments.

A further advantage of embodiments of the invention is that mechanisms are provided to prevent ambiguities at packet boundaries and at chip boundaries.

A further advantage of embodiments of the invention is that the transmitted signal does not contain sharp changes. Instead, the adjustment may be made so that the effect of the adjustment is smoothed in the transmitted signal.

A further advantage of embodiments of the invention is that a straightforward implementation is offered.

A further advantage of embodiments of the invention is that a low complexity implementation is offered.

BRIEF DESCRIPTION OF THE DRAWINGS

Further objects, features and advantages of the invention will appear from the following detailed description of embodiments of the invention, with reference being made to the accompanying drawings, in which:

FIG. 8 is a schematic figure illustrating example time alignment adjustments according to some embodiments of the invention.

DETAILED DESCRIPTION

Figure 1:
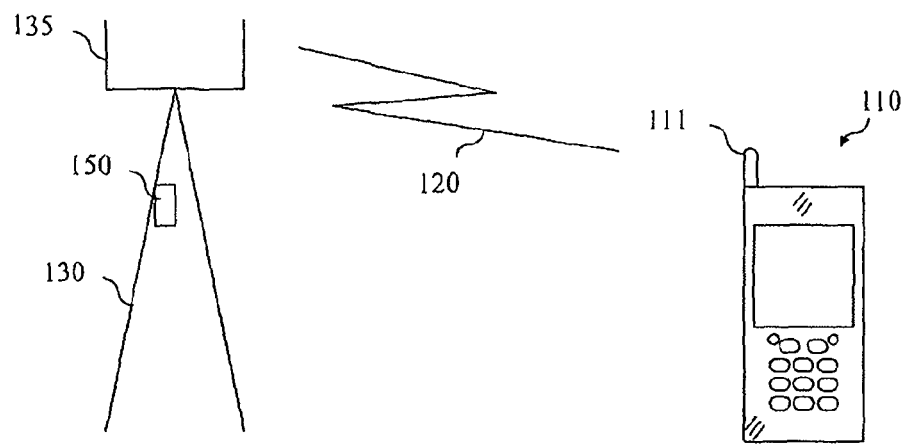
FIG. 1 is a schematic front view of a mobile terminal connected, through a radio link, to a base station site, wherein the mobile terminal may comprise arrangements according to some embodiments of the invention.

In the following, example embodiments of the invention will be described in which a time misalignment of a data stream is adjusted. The data stream may be a transmit data stream in a Wideband Code Division Multiple Access (WCDMA) transmitter. However, the invention is not limited to such cases. Contrarily, embodiments of the invention may be used in transmitter chains that use other transmission techniques, such as, for example, Orthogonal Frequency Division Multiplexing (OFDM).

As mentioned before, there may be a need, in some circumstances, for adjusting the time alignment to compensate for misalignment of the data stream. In some example scenarios, misalignment and/or congestion in the baseband module may be a reason that time alignment adjustment is needed. In some scenarios, the movement of a mobile communication device may be a reason that time alignment adjustment is needed as explained above. If, for example, the baseband stream misalignment is one chip, the call will be dropped according to some scenarios. In the 3GPP standard, adjustments of less than one-quarter chip are allowed (see TS 25.133 (2007-12), Section 7.1).

One way of achieving a time adjustment is to perform an adjustment in the baseband module/sub-system or in the digital interface. In general, however, this has the disadvantage that adjustments can only be made with a resolution of one chip.

Thus, this is not a preferable solution since omitting a full chip in uplink may be problematic. It may, for example, cause sharp changes in the transmitted signal. Base stations may not be programmed to track large sudden changes in the uplink timing. A large change may result in losing the connection with the mobile phone.

Introduction of a digital radio in the transmitter chain opens up the possibility of moving the modulator from the baseband sub-system to the digital radio. A modulator of a digital radio may have a resolution that is substantially higher than one chip.

Thus, if, for example, the modulation is being done using a pulse shaping filter which has the functionality of a 325 times over-sampled root raised cosine filter, then the time adjustment may be performed with a resolution of 1/325 of a chip.

Embodiments of the invention suggest that time adjustment is made in association with the digital radio modulator. In these embodiments the resolution of the time adjustment increases. In some embodiments, the resolution increases from one chip to 1/325 chip and adjustments of up to one quarter of a chip may be achieved. It should be noted that a resolution of 1/325 and a maximum adjustment of one quarter of a chip are merely example values. Other example values may be handled by some embodiments of the invention. Maximum adjustment values may be imposed by a communication standard applied by an example embodiment. For example, one quarter of a chip adjustment is imposed by the 3GPP standard document TS 25.133 (2007-12), Section 7.1.

In some embodiments, time adjustment is achieved by modifying coefficients of a pulse-shaping filter used in the digital radio modulator in a controlled manner. The pulse-shaping filter may practice over-sampling of the data stream, hence providing a higher resolution for the time adjustment. In some embodiments, this pulse-shaping filter is a polyphase filter used for up-sampling in the modulator. In some embodiments, the pulse shaping filter gives the functionality of a 325 times over-sampled root raised cosine filter multiplied with a Kaiser window with parameter 2.0.

When a time adjustment is needed, the baseband module may send the required adjustment value to the digital interface, which in turn may forward the adjustment value to the pulse shaping filter control. A strobe indicating when to apply the adjustment may also be provided.

In some embodiments, the modulator accepts timing adjustment values up to and including ±¼ chips, with a timing adjustment step size of 1/325 chip.

FIG. 1 illustrates an example mobile terminal 110 connected, through a radio link 120, to a base station site 130. The base station site 130 comprises one or more antennas 135 and at least one base station 150. The mobile terminal 110 may comprise an arrangement according to embodiments of the invention.

The mobile terminal 110 is illustrated as a mobile telephone in a schematic front view. This example mobile terminal 110 comprises an antenna 111 mounted on the housing of the apparatus. Alternatively, the mobile terminal 110 may have an internal antenna mounted within the housing of the apparatus. The mobile terminal 110 may even comprise multiple antennas. The mobile terminal 110 may further comprise a display, a keypad, a loudspeaker, and a microphone, which together provides a man-machine interface for operating the mobile terminal 110.

The example mobile terminal 110 is adapted to connect to a mobile telecommunication network via the wireless link 120 to the radio base station 150. Hence, a user of the mobile terminal 110 may use conventional circuit-switched telecommunication services such as voice calls, data calls, video calls, and fax transmissions, and/or packet-based services such as electronic messaging, VoIP, Internet browsing, electronic commerce, etc. To this end, the mobile terminal 110 and the base station 150 may be compliant with at least one mobile telecommunication standard, for instance UMTS or UMTS LTE.

Figure 2:
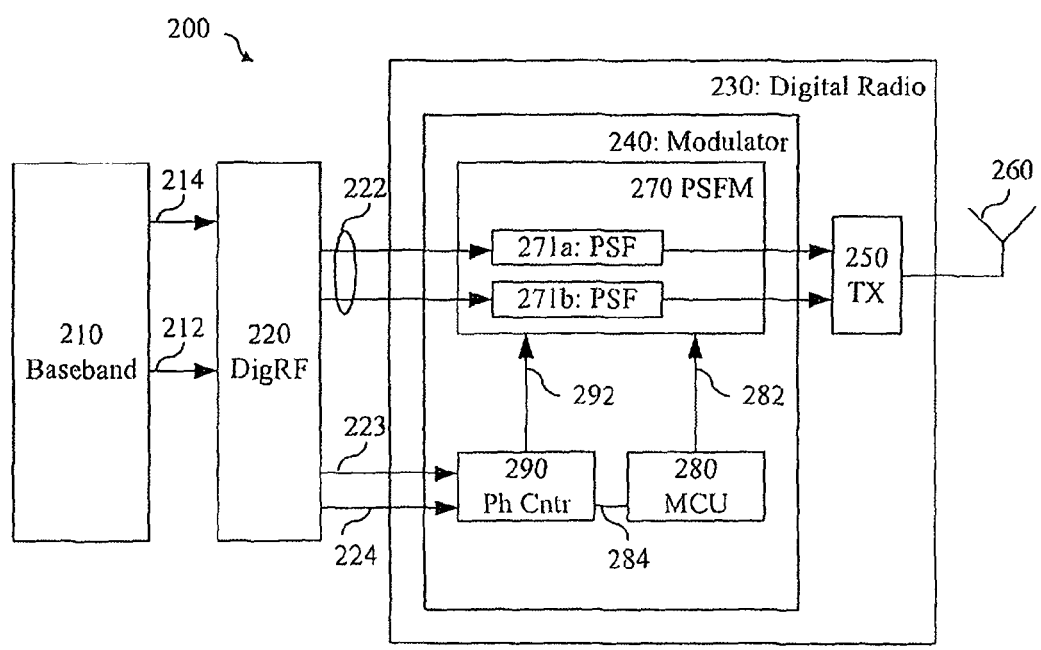
FIG. 2 is a block diagram illustrating parts of an example arrangement according to some embodiments of the invention.

FIG. 2 illustrates parts of an example arrangement 200 according to some embodiments of the invention. The illustrated arrangement 200 may be comprised in an electronic communication device, such as the mobile terminal 110 illustrated in FIG. 1.

The arrangement 200 comprises a baseband module 210, which is adapted to produce a digital data stream. At 212 the digital data stream may be transferred to a digital interface 220, such as a DigRF interface. The digital interface 220 may be adapted to split the digital data stream into an in-phase and a quadrature data stream. At 222 these in-phase and quadrature data streams are transferred to a digital radio 230.

The digital interface specifies the form and timing of communication between baseband and radio modules. In Dig RF, data may be sent in packets. Each packet may contain eight samples at chip rate, meaning that one sample corresponds to one chip. The chip rate may be 3.84 M samples per second. Samples may be represented by 12 or 16 bits. The samples may be divided equally between in-phase and quadrature branches. Thus, each packet may contain 4 samples (chips). The TX (transmit) data interface in Dig RF carries both data to be transmitted and RF IC (radio frequency integrated circuit) control information. More information regarding standard packing in the uplink may be found in "DigRF, Dual-mode 2.5G/3G, Baseband/RF IC", Interface Standard, v3.09, 22 Nov. 2006, section 7.1.3.

The digital radio 230 comprises a modulator 240, such as a wideband modulator in the case of WCDMA, and transmitter circuitry (TX) 250. The modulator 240 is adapted to up-sample and modulate the in-phase and quadrature data streams respectively and the transmitter circuitry 250 is adapted to transmit the modulated data steams via one or more antennas 260.

Before the in-phase and quadrature data streams enter the modulator 240, they may undergo rounding and saturation operations. The in-phase and quadrature data streams then enter the modulator 240, which comprises a pulse shaping filter modulator (PSFM) 270. The pulse shaping filter modulator 270 is adapted to process the in-phase and quadrature data streams separately using two pulse shaping filters (PSF) 271a and 271b. The modulator 240 also comprises a modulation control unit (MCU) 280 and a phase counter (Ph Cntr) 290. The modulation control unit 280 and the phase counter 290 are operatively connected at 284. The modulation control unit 280 and the phase counter 290 are operatively connected to the pulse shaping filter modulator 270 at 282 and 292 respectively.

It should be noted that, in other embodiments, the digital interface might not split the digital data stream into an in-phase and a quadrature data stream. Instead the digital data stream is transferred to the digital radio 230 via a single connection and the digital radio 230 processes the digital data stream as a single data stream.

A time adjustment control signal may be transferred from the baseband module 210 to the digital interface 220 as shown at 214. The time adjustment control signal may, for example, be included in the RF IC control information in DigRF. This time adjustment control signal may indicate whether time adjustment is needed. In some embodiments, it may also indicate when the time adjustment should be applied. In some embodiments, the time adjustment control signal is associated with a packet of the data stream. The timing of the packet sent from the baseband module to the digital radio may, for example, be adjusted at the same time as the control command is sent to the digital radio.

The digital interface 220 may convert the time adjustment control signal to a time adjustment value and transfer this value to the digital radio as shown at 223. The digital interface 220 may also convert the time adjustment control signal to an apply time adjustment flag and transfer this flag to the digital radio as shown at 224. In some embodiments, there is no indication of when to apply the adjustment in the time adjustment control signal. In such embodiments, the apply time adjustment flag may be created by the digital interface 220. In yet some embodiments, the digital interface 220 does not convert the time adjustment signal. Instead the time adjustment signal is simply forwarded to the digital radio 230.

Figure 3A:
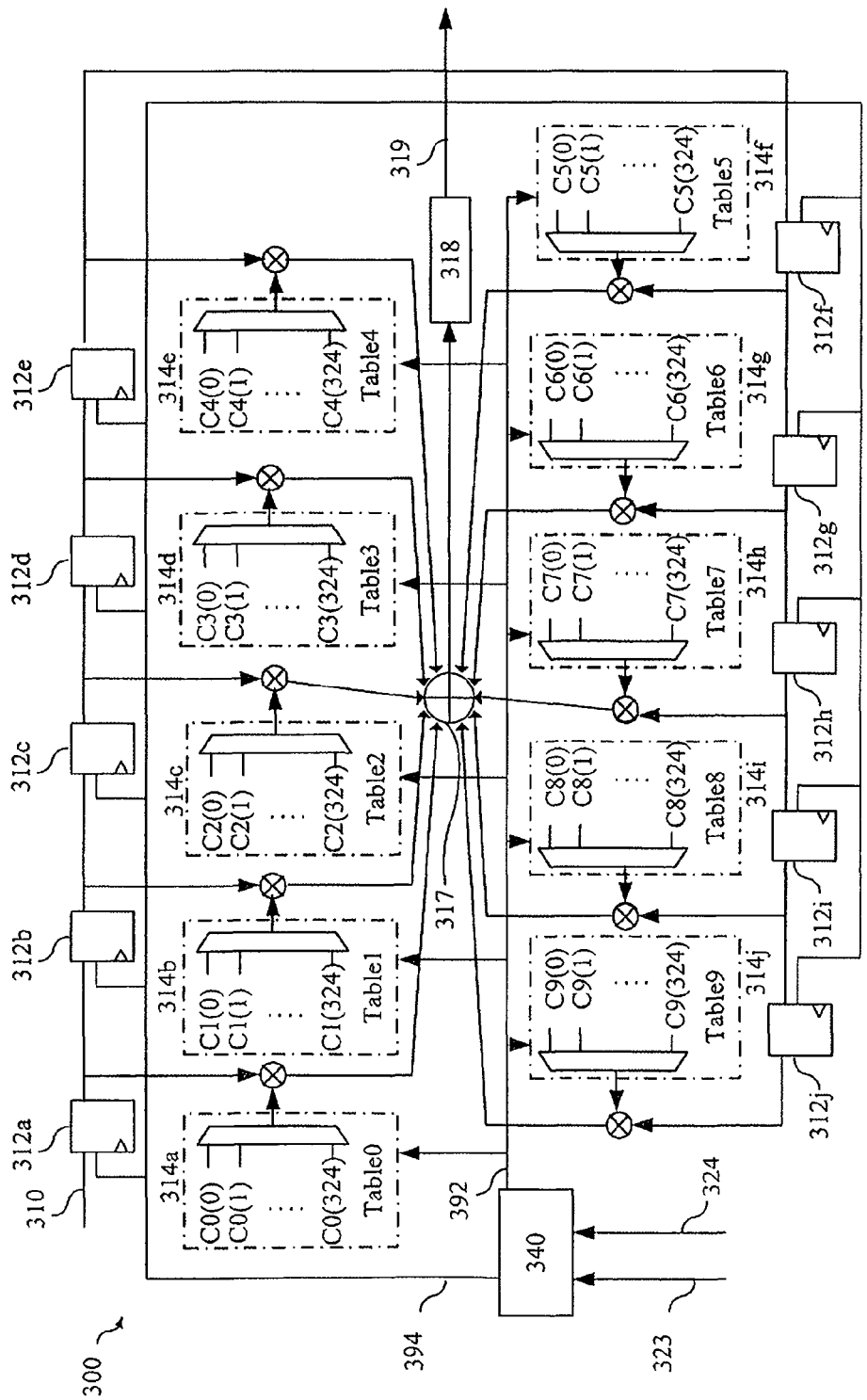
FIG. 3A is a block diagram illustrating an example pulse-shaping filter according to some embodiments of the invention.

FIG. 3A illustrates an example implementation of a pulse-shaping filter 300 according to some embodiments of the invention. The pulse-shaping filter 300 may for example be comprised in the pulse shaping filters 271a and 271b of FIG. 2.

The signal at the input 310 of the pulse-shaping filter 300 may be the in-phase or quadrature data stream received from the digital interface 220 of FIG. 2. In a conventional manner, each symbol (chip) of the input signal is shifted along a first-in first-out (FIFO) shift register, which is made up by memory elements 312a-j. The symbols are shifted one step each time the control signal 394 is set.

The content of each memory element 312a-j is multiplied by a corresponding filter coefficient 314a-j. The results of the multiplications are accumulated in adder 317 and output from the pulse-shaping filter 300 at 319, possibly after rounding in 318.

As can be seen in FIG. 3A, each coefficient 314a-j is variable. Each coefficient may, for example comprise a table of coefficient values. A phase, illustrated at 392, determines the coefficient value that should be used. For example, the phase may specify which value in a table to apply in the multiplication. The phase is updated during each filter clock cycle. A new result is output at 319 for each update of the phase.

The illustrated pulse-shaping filter 300 has a poly-phase structure, which reduces implementation cost. The illustrated poly-phase structure has a filter bank of 325 coefficient vectors. Each vector consists of 10 coefficients values. The 325 coefficient vectors differ in sample phase, representing a time shift of (0 . . . 324)/325 chip, i.e. each change of vector bank changes the phase by ⅟325 chip.

The phase is determined by a phase calculation unit 340 and is output to the coefficient tables at 392. The phase calculation unit may comprise the modulation control unit 280 and the phase counter 290 of FIG. 2. The phase control unit 340 receives information regarding the time adjustment value and the apply time adjustment flag as illustrated at 323 and 324 (compare with 223 and 224 of FIG. 2).

It should be noted that that the time alignment adjustment according to embodiments of the invention may be achieved also when other types of filters are used. Thus, the invention is not limited to pulse shaping filters of a poly-phase structure.

Figure 3B:
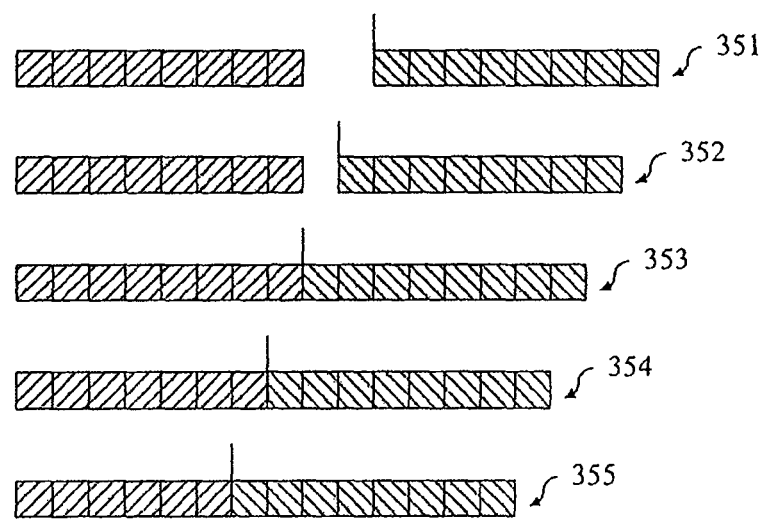
FIG. 3B is a schematic diagram illustrating time alignment adjustments according to embodiments of the invention.

FIG. 3B illustrates an example with 8 times chip rate oversampling. In this example, an adjustment of an eighth of a chip will be equivalent to repeating one sample or ignoring one sample depending on if the required adjustment is negative or positive. In FIG. 3B, two chips (each comprising 8 samples) are shown in different adjustment situations, wherein 351 represents an adjustment of −¼ chip, 352 represents an adjustment of −⅛ chip, 353 represents a situation with no adjustment, 354 represents an adjustment of ⅛ chip, and 355 represents an adjustment of ¼ chip.

Figure 4:
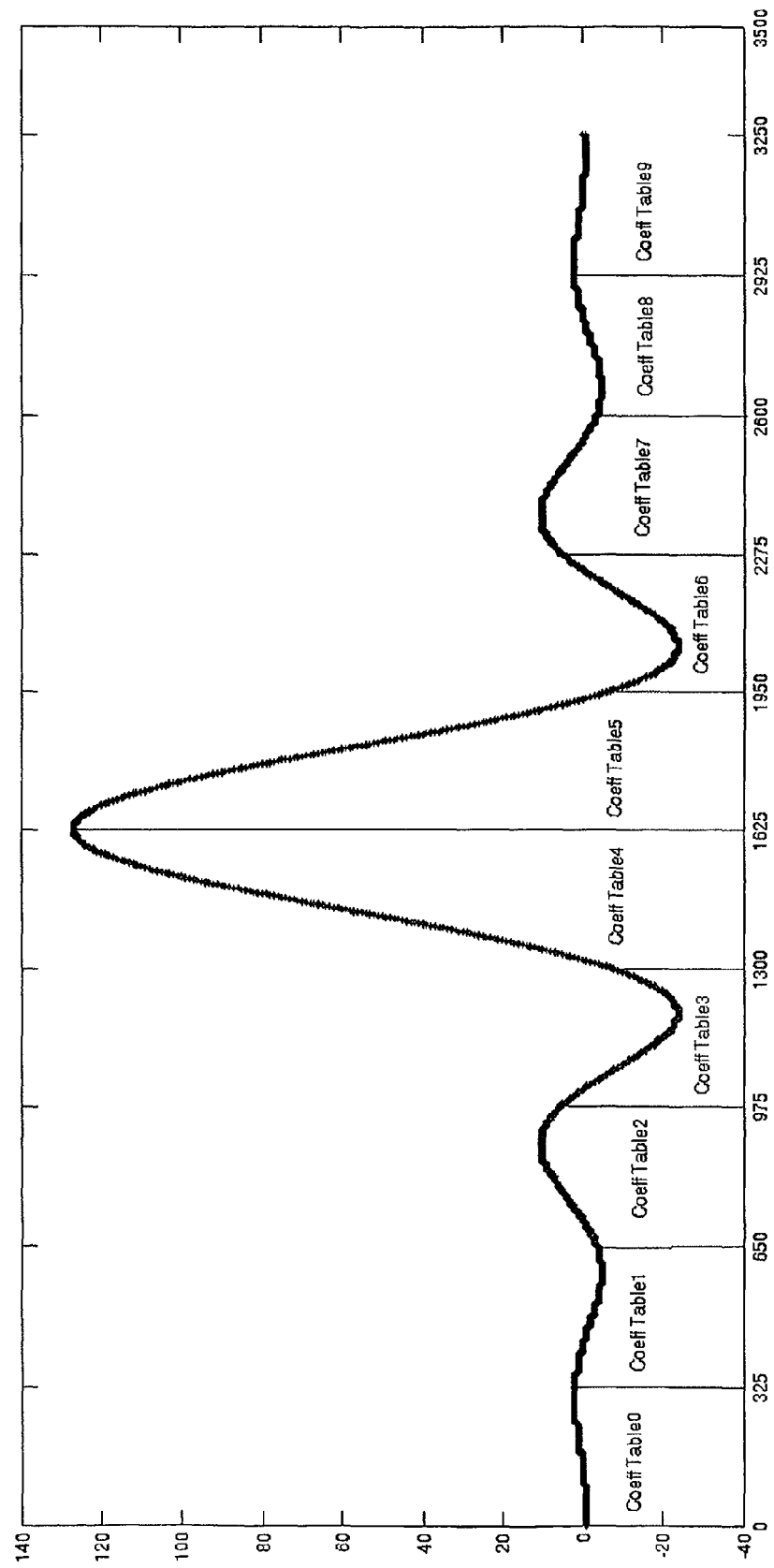
FIG. 4 is a plot illustrating an example pulse shaping filter function according to some embodiments of the invention.

FIG. 4 illustrates an example pulse shaping filter function 400 according to some embodiments of the invention. This example filter function 400 is a root raised cosine function and may be used in the pulse-shaping filter 300 of FIG. 3A. The filter function 400 is illustrated with ten coefficient tables (compare 314a-j of FIG. 3A), and each coefficient table comprises 325 coefficient values in this example.

The operation of an arrangement according to embodiments of the invention will now be described with reference to FIGS. 2, 3 and 4.

Phase calculation 280, 290, 340 has the main control over the pulse shaping filters 271a, 271b, 300. In normal operation (when no time adjustment is needed), the phase counter updates the phase by adding a default value modulus the coefficient table size in each filter clock cycle. The calculated phase may then be used as an index in each coefficient table 314a-j. When the phase is wrapped due to the modulus operation, a new symbol is shifted into the pulse shaping filter 271a, 271b, 300 at 310.

The example pulse-shaping filter 300 is clocked with a 52 MHz clock. The input to the filter is samples at chip rate, e.g. 3.84 MHz, each represented with, for example, 12 bits. The index to the filter vector bank may be updated by the default value 24 each 1/52 MHz cycle, this is because 52/3.84=325/24. Thus, with these example numerical values, the following pseudo code may illustrate an example phase calculation algorithm:

```
phase <= 0;
while (1) loop
    t_phase := phase+24;
    if t_phase >= 325 then phase <= t_phase−325;
    shift_en <= '1';
    else phase <= t_phase; shift_en <= '0';
end loop;
```

In this pseudo code, shift_en denotes a flag for reading a new symbol to the filter and shift the previous data one step forward.

The time adjustment control signal (time adjustment value and the apply time adjustment flag) may be used in the modulator 240 to determine when and how much the time alignment should be adjusted.

If the time adjustment control signal indicates that an adjustment is needed (e.g. if the time adjustment value is not zero and the apply time adjustment flag is set), the phase may be updated by adding the default value and the time adjustment value modulus the coefficient table size.

In some embodiments, there may be mechanisms for avoiding ambiguities at chip boundaries (i.e. when the phase is wrapped) as will be explained later. Such mechanisms may be controlled by the modulation control unit 280.

Figure 5:
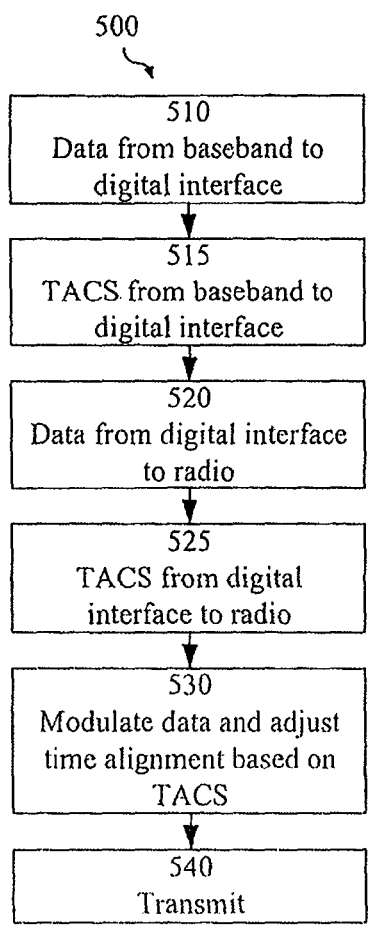
FIG. 5 is a flow chart illustrating example method steps according to some embodiments of the invention.

FIG. 5 illustrates an example method 500 according to some embodiments of the invention. The method steps of method 500 may, for example be performed in an arrangement such as arrangement 200 of FIG. 2.

In step 510, a sampled data stream is transferred from a baseband unit to a digital interface. The sampled data stream may be divided into packets. In step 515, a time adjustment control signal (TACS) is transferred from the baseband unit to the digital interface. Steps 510 and 515 may be performed in sequence or in parallel.

In step 520, the sampled data stream is transferred from the digital interface to a digital radio. The data stream may or may not have been processed by the digital interface. It may for example have been split into an in-phase and a quadrature stream. In step 525, the time adjustment control signal is transferred from the digital interface to the digital radio. The time adjustment control signal may or may not have been processed by the digital interface. For example it may have been converted to a time adjustment value and an apply time adjustment flag. Steps 520 and 525 may be performed in sequence or in parallel.

The data stream is modulated in the digital radio in step 530. During the modulation, the timing of the data stream is adjusted, based on the time adjustment control signal. Finally, in step 540, the modulated signal is transmitted.

Figure 6:
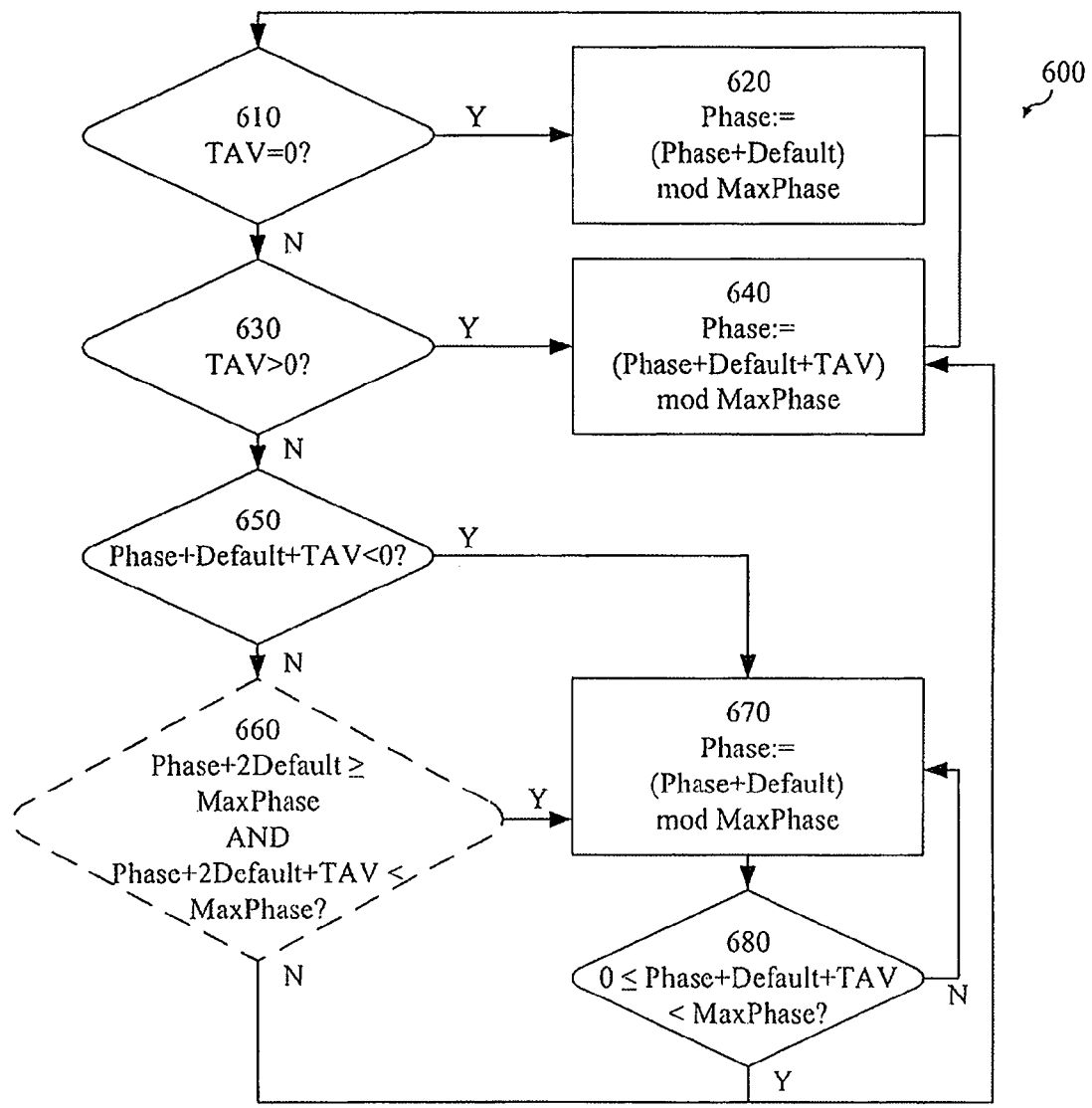
FIG. 6 is a flow chart illustrating example method steps according to some embodiments of the invention.

FIG. 6 illustrates an example method 600 according to some embodiments of the invention. The method steps of method 600 may, for example be performed by the modulation control unit 280 and the phase counter 290 of FIG. 2.

In step 610, it is determined whether the time adjustment value (TAV) is zero (i.e. no time adjustment is required).

If the time adjustment value is zero (YES-path out of step 610), the phase is updated by adding a default value (modulus a maximal phase value) in step 620 and the process returns to step 610 to update the phase in the next filter clock cycle.

If the time adjustment value is not zero (NO-path out of step 610), then the process proceeds to step 630 where it is determined whether the time adjustment value is positive.

If the time adjustment value is positive (YES-path out of step 630), the phase is updated by adding the default value and the time adjustment value (modulus the maximal phase value) in step 640 and the process returns to step 610 to update the phase in the next filter clock cycle.

If the time adjustment value is not positive (NO-path out of step 630), then the process proceeds to step 650 where it is determined whether adding the default value and the time adjustment value (no modulus) would result in a negative phase. This corresponds to the case where the FIFO 312a-j of the pulse-shaping filter 300 in FIG. 3A would have to be shifted backwards, which is an unrealistic course of action. Thus, if this is the case, then the time adjustment must be postponed.

If adding the default value and the time adjustment value (no modulus) would not result in a negative phase (NO-path out of step 650), then the process proceeds to step 660.

In step 660 it is determined whether adding twice the default value and the time adjustment value (no modulus) would result in a phase that is less than a threshold and adding twice the default value (no modulus) would result in a phase that is not less than the threshold. The threshold may be equal to the maximal phase value. This scenario corresponds to the case where the phase is already close to its maximum value and there is a risk of getting into the situation when the FIFO 312a-j of the pulse-shaping filter 300 in FIG. 3A would have to be shifted backwards. Thus, if this is the case, then the time adjustment must be postponed.

If this is not the case (NO-path out of step 660), then the process proceeds to step 640, where the phase is updated by adding the default value and the time adjustment value (modulus the maximal phase value), Then, the process returns to step 610 to update the phase in the next filter clock cycle.

If, however, it was determined that there is a risk of getting into the situation when the FIFO 312a-j of the pulse shaping filter 300 in FIG. 3A would have to be shifted backwards (YES-paths out of steps 650 and 660), then the time adjustment must be postponed and the process proceeds to step 670.

In step 670, the phase is updated by adding the default value (modulus the maximal phase value). Then, for the next filter clock cycle, it is determined in step 680 whether there is no longer any risk of getting into the situation when the FIFO 312a-j of the pulse shaping filter 300 in FIG. 3A would have to be shifted backwards. This is determined by checking whether adding the default value and the time adjustment value (no modulus) would result in a non-negative phase that is less that the threshold.

If this is not the case (NO-path out of step 680), steps 670 and 680 are repeated for each filter clock cycle until the risk has vanished.

If adding the default value and the time adjustment value (no modulus) would result in a non-negative phase that is less that the threshold (YES-path out of step 680), then the process proceeds to step 640, where the phase is updated by adding the default value and the time adjustment value (modulus the maximal phase value). Then, the process returns to step 610 to update the phase in the next filter clock cycle.

In alternative embodiments, decision step 660 is omitted. In these embodiments, the NO-path out of step 650 leads directly to step 640, where the phase is updated by adding the default value and the time adjustment value (modulus the maximal phase value), Then, the process returns to step 610 to update the phase in the next filter clock cycle.

It is to be noted that if the time adjustment value is negative, there are different ways to proceed according to embodiments of the invention.

In some embodiments, the time adjustments value is subtracted from the phase as explained above. In some of these embodiments, the special cases where there is a risk of getting a resulting negative phase may be handled separately as described above.

In some embodiments, the phase may be held at a fixed value (thus not updating with the default value) for a specified amount of time if the time adjustment value is negative. The specified amount of time may be a number of clock cycles equal to the floor value of the time adjustment value divided by the default value. When the specified amount of time has lapsed, the phase may be incremented by the time adjustment value modulus the default value and by the default value. Then the process may go back to incrementing the phase by the default value (compare with step 620).

In some embodiments, the phase may be updated using increment values that are less than the default value if the time adjustment value is negative. In these embodiments, the time adjustment is thus spread out over time. If, for example, the time adjustment value is −50 and the default value is 24, then the phase may be incremented by 14 instead of 24 in each of the subsequent 5 clock cycles. Then the process may go back to incrementing the phase by the default value (compare with step 620).

Figure 7:
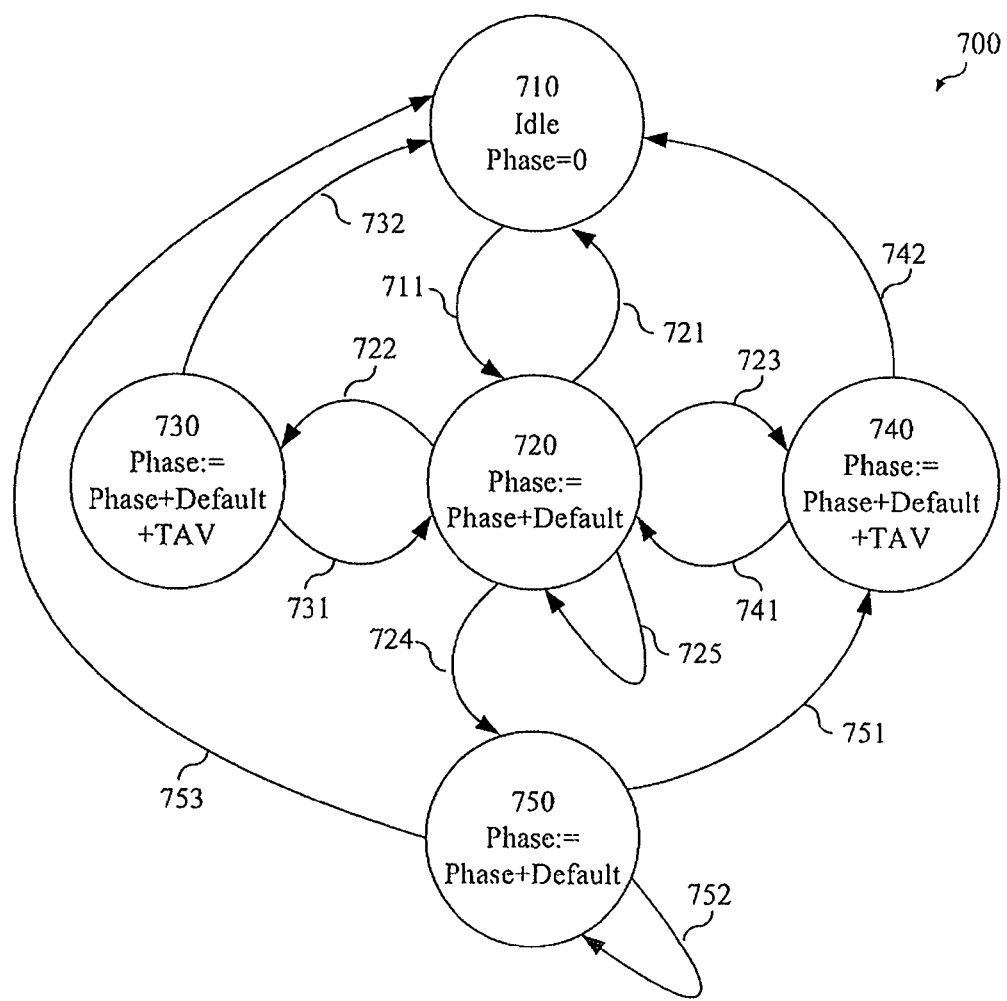
FIG. 7 is a state diagram illustrating example state transitions according to some embodiments of the invention.

FIG. 7 is a state diagram 700 illustrating example state transitions according to some embodiments of the invention. The state diagram may, for example, describe operation of the modulation control unit 280 and the phase counter 290 of FIG. 2. The transitions in the state diagram 700 may also be compared with the method steps of method 600. In idle state 710, there is no data to modulate. When data arrives, the state changes to state 720 via transition 711 and modulation starts. The state machine remains in state 720 as long as there is data to modulate and no time adjustment is needed. The phase is updated (repeatedly) by adding the default value (modulus a maximum phase value) as illustrated by transition 725. If there is no more data to modulate the state machine returns to the idle state 710 via transition 721.

If a time adjustment is needed and the time adjustment value is positive, the state changes to state 730 via transition 722. In state 730, the phase is updated by adding the default value and the time adjustment value (modulus the maximum phase value). When the phase has been updated, the state changes back to state 720 via transition 731 unless there is no more data to modulate, in which case the state machine returns to the idle state 710 via transition 732.

If a time adjustment is needed and the time adjustment value is negative, the state changes to state 740 via transition 723 if there is no risk of the ambiguity as described in relation to method steps 650 and 660 of method 600 in FIG. 6. In state 740, the phase is updated by adding the default value and the time adjustment value (modulus the maximum phase value). When the phase has been updated, the state changes back to state 720 via transition 741 unless there is no more data to modulate, in which case the state machine returns to the idle state 710 via transition 742.

If a time adjustment is needed, the time adjustment value is negative, and there is a risk of the ambiguity as described in relation to method steps 650 and 660 of method 600 in FIG. 6, then the state changes to waiting state 750 via transition 724. In state 750, the phase is updated by adding the default value (modulus the maximum phase value), as illustrated by transition 752, until the risk has vanished or there is no more data to modulate. If there is no more data to modulate, the state machine returns to the idle state 710 via transition 753. When the risk has vanished, the state changes to state 740 via transition 751. In state 740, the phase is updated by adding the default value and the time adjustment value (modulus the maximum phase value). When the phase has been updated, the state changes back to state 720 via transition 741 unless there is no more data to modulate in which case the state machine returns to the idle state 710 via transition 742.

Figure 8:
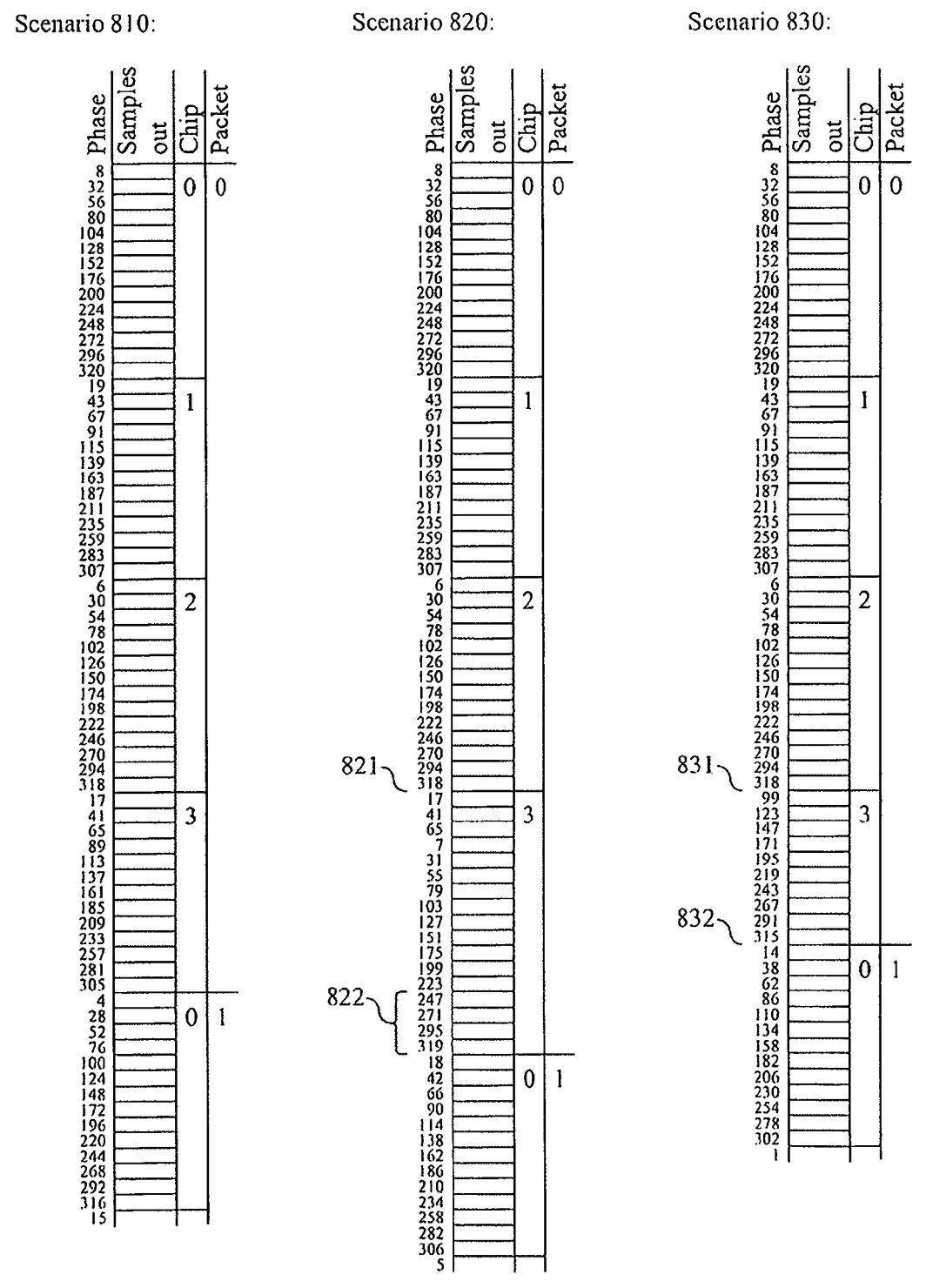

FIG. 8 illustrates three scenarios 810, 820, 830 of example time alignment adjustments according to some embodiments of the invention.

Scenario 810 illustrates the situation when no time adjustment is needed. The illustrated scenario starts with Packet 0, Chip 0. The phase is initiated to a random phase, in this case 8. The default phase update value is set to 24 in this example. Each time the phase counter wraps around the maximum phase (here: 325), a new chip is read from the digital interface.

Scenario 820 illustrates the situation when a time adjustment of −82 (corresponding to one quarter of a chip) is needed. In this scenario, the time adjustment is done in the last chip in the packet (Chip 3, Packet 0). The phase is decremented in Chip 3 as soon as it is possible to subtract 82 without getting a negative number, which is at 821 (65+24−82=7>0). The effect of applying the time adjustment is that Chip 3 stays longer in the pulse shaping filter, see 822, and the next packet (Packet 1) is read later compared to scenario 810. The samples that are output from the pulse-shaping filter after the time adjustment are not copies of any samples before or after.

Scenario 830 illustrates the situation when a time adjustment of 82 is needed. In this scenario, the time adjustment is also done in the last chip in the packet (Chip 3, Packet 0). The phase is incremented by 82 as soon as we are in Chip 3 and the time adjustment value is available (in the illustrated scenario, this occurs in the beginning of Chip 3, see 831). The effect of applying the time adjustment is that Chip 3 stays a shorter period in the pulse shaping filter, see 832, and the next packet (Packet 1) is read earlier compared to scenario 810.

In the illustrated scenarios, the time adjustment was applied in the last chip of a packet. It is to be noted that this is merely an example implementation, and that the time adjustment may be applied in any chip of a packet.

The described embodiments of the invention and their equivalents may be performed in hardware or software or in a combination of both hardware and software.

Embodiments of the invention may be performed by general-purpose circuits associated with or integral to a receiver, such as digital signal processors (DSP), central processing units (CPU), co-processor units, or by specialized circuits such as for example application-specific integrated circuits (ASIC). All such forms are contemplated to be within the scope of the invention.

The invention may be embodied within an electronic apparatus comprising a transmitter chain having arrangements or performing methods according to any of the embodiments of the invention. The electronic apparatus may, for example, be a portable or handheld mobile radio communication equipment, a mobile radio terminal, a mobile telephone, a pager, a communicator, an electronic organizer, a smartphone, a computer, an embedded drive, a mobile gaming device, or a (wrist) watch.

According to some embodiments of the invention, a computer program product comprises a computer readable medium such as, for example, a diskette or a CD-ROM. The computer readable medium may have stored thereon a computer program comprising program instructions. The computer program may be loadable into a data-processing unit, which may, for example, be comprised in the mobile terminal 110. When loaded into the data-processing unit, the computer program may be stored in a memory associated with or integral to the data-processing unit. According to some embodiments, the computer program may, when loaded into and run by the data-processing unit, cause the data-processing unit to execute method steps according to, for example, the methods shown in FIGS. 5 and 6.

The invention has been described herein with reference to various embodiments. However, a person skilled in the art would recognize numerous variations to the described embodiments that would still fall within the scope of the invention. For example, the method embodiments described herein describes example methods through method steps being performed in a certain order. However, it is recognized that these sequences of events may take place in another order without departing from the scope of the invention. Furthermore, some method steps may be performed in parallel even though they have been described as being performed in sequence.

In the same manner, it should be noted that in the description of embodiments of the invention, the partition of functional blocks into particular units is by no means limiting to the invention. Contrarily, these partitions are merely examples. Functional blocks described herein as one unit may be split into two or more units. In the same manner, functional blocks that are described herein as being implemented as two or more units may be implemented as a single unit without departing from the scope of the invention.

Hence, it should be understood that the limitations of the described embodiments are merely for illustrative purpose and by no means limiting. Instead, the invention is construed to be limited by the appended claims and all reasonable equivalents thereof.

The invention claimed is:

1. A method of adjusting time alignment of a sampled data stream having a first sample resolution comprising:
    transferring the sampled data stream from a baseband subsystem to a digital interface;
    transferring the sampled data stream from the digital interface to a digital radio comprising a pulse shaping filter modulator;
    modulating the sampled data stream using the pulse shaping filter modulator;
    transmitting the modulated sampled data stream; and
    transferring a time adjustment control signal from the baseband subsystem to the digital radio;
    wherein the modulating comprises adjusting, based on the time adjustment control signal, the time alignment of the sampled data stream using a second sample resolution; and
    wherein the adjusting the time alignment of the sampled data stream comprises:
        adjusting a phase of a pulse-shaping filter of the pulse shaping filter modulator based on time adjustment control signal; and modifying coefficients of the pulse shaping filter based on the adjusted phase.

2. The method of claim 1, wherein transferring the time adjustment control signal from the baseband subsystem to the digital radio comprises:
   transferring the time adjustment control signal from the baseband subsystem to the digital interface;
   converting the time adjustment control signal to a time adjustment value; and
   transferring the time adjustment value from the digital interface to the digital radio.

3. The method of claim 2, further comprising:
   converting the time adjustment control signal to an apply time adjustment flag;
   transferring the apply time adjustment flag from the digital interface to the digital radio; and
   performing the adjusting the time alignment of the sampled data stream when the apply time adjustment flag is set.

4. The method of claim 2, wherein adjusting the phase of the pulse shaping filter based on time adjustment control signal comprises:
   updating the phase of the pulse shaping filter by adding a default phase update offset value and the time adjustment value to the phase.

5. The method of claim 4, further comprising:
   determining whether adjusting the phase of the pulse shaping filter would result in reprocessing of a sample of the sampled data stream; and
   if adjusting the phase of the pulse-shaping filter would result in reprocessing of a sample of the sampled data stream:
      postponing the step of adjusting the time alignment of the sampled data stream; and
      updating the phase of the pulse-shaping filter by adding the default phase update offset value to the phase.

6. The method of claim 4, further comprising:
   determining whether adding the default phase update offset value and the time adjustment value to the phase gives a first result value that is less than a threshold; and
   if the first result value is less than the threshold:
      postponing the step of adjusting the time alignment of the sampled data stream; and
      updating the phase of the pulse-shaping filter by adding the default phase update offset value to the phase.

7. The method of claim 6, wherein the threshold is zero.

8. An arrangement for adjusting time alignment of a sampled data stream having a first sample resolution comprising:
   a baseband subsystem;
   a digital interface; and
   a digital radio comprising a modulator and a transmitter;
   wherein the baseband subsystem is adapted to transfer the sampled data stream to the digital interface, the digital interface is adapted to transfer the sampled data stream to the digital radio, the modulator is adapted to modulate the sampled data stream, and the transmitter is adapted to transmit the modulated sampled data stream;
   wherein the baseband subsystem is adapted to transfer a time adjustment control signal to the digital radio;
   wherein the modulator is adapted to adjust, based on the time adjustment control signal, the time alignment of the sampled data stream using a second sample resolution;
   wherein the modulator comprises:
      a Wideband Code Division Multiple Access (WCDMA) modulator that comprises a pulse shaping filter modulator;
      a phase counter adapted to provide a phase of a pulse-shaping filter of the pulse shaping filter modulator; and
      a modulation control unit adapted to adjust the phase based on time adjustment control signal;
   wherein the pulse shaping filter modulator is adapted to modify coefficients of the pulse-shaping filter based on the adjusted phase.

9. The arrangement of claim 8:
   wherein the baseband subsystem is further adapted to transfer the time adjustment control signal to the digital interface; and
   wherein the digital interface is further adapted to convert the time adjustment control signal to a time adjustment value and to transfer the time adjustment value to the digital radio.

10. The arrangement of claim 9:
    wherein the digital interface is further adapted to convert the time adjustment control signal to an apply time adjustment flag and to transfer the apply time adjustment flag to the digital radio; and
    wherein the modulator is adapted to adjust the time alignment of the sampled data stream when the apply time adjustment flag is set.

11. The arrangement of claim 9, wherein the modulation control unit is further adapted to update the phase of the pulse shaping filter by adding a default phase update offset value and the time adjustment value to the phase.

12. The arrangement of claim 11, wherein the modulation control unit is further adapted to:
    determine whether adjusting the phase of the pulse shaping filter would result in reprocessing of a sample of the sampled data stream; and
    if adjusting the phase of the pulse-shaping filter would result in reprocessing of a sample of the sampled data stream:
       postpone adjustment of the time alignment of the sampled data stream; and
       instruct the phase counter to update the phase of the pulse-shaping filter by adding the default phase update offset value to the phase.

13. The arrangement of claim 11, wherein the modulation control unit is further adapted to:
    determine whether adding the default phase update offset value and the time adjustment value to the phase gives a first result value that is less than a threshold; and
    if the first result value is less than the threshold:
       postpone adjustment of the time alignment of the sampled data stream; and
       instruct the phase counter to update the phase of the pulse-shaping filter by adding the default phase update offset value to the phase.

* * * * *